United States Patent [19]

Fehling et al.

[11] 4,431,713
[45] Feb. 14, 1984

[54] METHOD FOR ADAPTING HIGH VOLTAGE CELLS OR BATTERIES FOR LOWER VOLT RATED APPLICATIONS

[75] Inventors: John R. Fehling, New Hyde Park, N.Y.; John P. Mathews, Mississauga, Canada; Thomas Yatabe, Norcross, Ga.

[73] Assignee: Duracell Inc., Bethel, Conn.

[21] Appl. No.: 368,535

[22] Filed: Apr. 15, 1982

[51] Int. Cl.³ .............................................. H01M 2/00
[52] U.S. Cl. ........................................ 429/7; 429/50; 429/61; 429/122
[58] Field of Search ................ 429/7, 50, 92, 61, 122, 429/1

[56] References Cited

U.S. PATENT DOCUMENTS

| 2,672,498 | 3/1954 | Temple | 429/7 |
| 3,811,944 | 5/1974 | Liang et al. | 429/7 |
| 3,885,991 | 5/1975 | Finkel | 429/1 |
| 3,941,135 | 3/1976 | von Sturm et al. | 429/7 X |
| 4,306,001 | 12/1981 | Brown | 429/61 |

FOREIGN PATENT DOCUMENTS

| 482550 | 3/1938 | United Kingdom | 429/7 |
| 973304 | 10/1964 | United Kingdom | 429/7 |
| 815797 | 3/1981 | U.S.S.R. | 429/1 |

Primary Examiner—Anthony Skapars
Attorney, Agent, or Firm—Ronald S. Cornell; Israel Nissenbaum

[57] ABSTRACT

A high voltage cell or battery has its voltage reduced for lower voltage applications by means of volt lowering diodes i.e. p-n junction and resistive elements placed in series with the cells and the appliance to be electrically powered.

8 Claims, 3 Drawing Figures

METHOD FOR ADAPTING HIGH VOLTAGE CELLS OR BATTERIES FOR LOWER VOLT RATED APPLICATIONS

This invention relates to high voltage cells and batteries and their utilization in lower volt rated applications and more specifically to alkaline $Zn/MnO_2$ cells or batteries being utilized in equipment adapted for the lower voltage Zn/Carbon cells or batteries.

For many years flashlights, lanterns and other portable lighting appliances were powered by the ubiquitous Zn/Carbon or leclanche cells or batteries. Consequently such lighting equipment was adapted to the voltages obtained from such cells or series multiples of such cells. Leclanche cells and concomitantly batteries of such cells embodied very rapidly declining voltages such as in typical lantern batteries from an initial voltage of about 1.55 to about 1.2 volts in less than about 5 hours. Accordingly, bulbs utilized in flashlights, lanterns and the like adapted for leclanche cell or battery use were rated in comformity with such rapidly achieved low voltages. However, alkaline $Zn/MnO_2$ cells of similar size generally require from about four to six times as long to achieve the same voltages as the leclanche cells. As a result, the bulbs rated for the lower voltages of leclanche cells are exposed to higher voltages for longer periods of time when utilized with alkaline cells and the advantage of the alkaline cells or batteries of long discharge life is prematurely obviated by rapid bulb failure.

It is an object of the present invention to provide a means for enabling the effective use of high voltage cells or batteries in lower voltage applications.

It is a further object of the present invention to provide a means whereby specifically an alkaline $Zn/MnO_2$ cell or battery may be utilized in a lighting appliance adapted for leclanche cell or battery use without premature failure of the appliance.

These and other objects, features and advantages of the present invention will become more evident from the following discussion and drawings in which.

Figure 2:
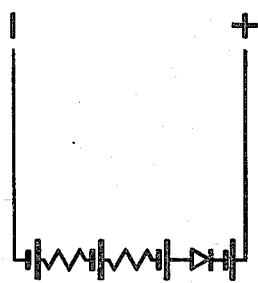
FIG. 2 is an electrical schematic of the voltage reduction means in the battery of FIG. 1.

Generally the present invention comprises a means for reducing the operating voltage of high voltage cells or batteries whereby such cells or batteries become compatible with equipment adapted for cells or batteries having lower operating voltages. The voltage reduction means of the present invention comprises one or more diode or p-n junctions hereinafter referred to as "diodes", together with one or more resistive elements placed in series with the cell or the cells of the battery and the appliance utilizing the cell or battery of cells. The voltage drop attainable with the most common diodes of silicon and germanium are constant at varying current drains at about 0.7 and 0.3 volts respectively with the diodes being serially cumulated to achieve higher desired voltage drops.

Coupled with the voltage drop of the diode or diodes is the voltage drop of one or more resistive elements placed in series with the diode or diodes. The resistive element may either be a resistor or more preferably comprises an intercell connector such as a metal tab having the requisite degree of resistivity. The use of a resistive metal tab is preferred since it eliminates the need for a component other than those normally utilized in a battery. Examples of metals having the requisite degree of resistivity, in the size and thickness of metal tabs commonly utilized for intercell connection, include the various alloys of nickel and chromium. The resistor or resistive element or elements should provide a total resistivity in the series connected circuit of between 0.1 to 10 ohms per cell. The average voltage drop associated with a preferred (because of its utilizable dimensions—with proper resistance characteristics—for intercell tab stock) nickel chromium alloy, Trophet C (trademark of W. B. Driver Co. for its 60% Ni, 16% Cr and 24% Fe alloy) in 2.25 mil (0.056 mm) thick ribbon is about 0.25 volt with a resistance of 2.27 ohms/ft (0.7 ohms/meter). Thus, for example, in a four cell battery having two intercell connectors of about 1.5" (3.8 cm) each, the Trophet C metal alloy tabs provide a resistance of about 0.5 ohm or 0.125 ohm per cell. Utilization of a resistor or resistive element of higher resistance to provide a greater voltage drop in lieu of the diode is undesirable for several reasons. Increasing the resistance of metal tab stock results in a more fragile interconnector increasingly subject to breakage. Furthermore, since the resistive element is primarily a reducer of current rather than of voltage a higher resistance would unduly reduce utilizable cell capacity with excessive heat generation. Furthermore, in lantern applications wherein a flasher is included therewith a resistor in the circuitry thereof would cause undesirable flashing in the latern segment because of the continual current changes in the current requirements of the flasher segment. Diodes, on the other hand, have been found to maintain a constant voltage drop regardless of current drain. However, because diodes such as those of silicon and germanium are current sensitive under cell short circuit conditions they must be at least minimally protected by the current reducing resistor particularly when utilized with high current drain lantern or flashlight cells or batteries.

Though diodes have been utilized in the past as battery protective devices they have been placed in parallel circuit with the individual cells for the purpose of preventing cell reversal. In such parallel electrical configuration however, any voltage drop attained was minimal without the effect of the series connected diode or diodes of the present invention. It is further noted that the voltage dropping diode of the present invention may be utilized with both a single cell or series of cells in a battery. However, since cell reversal is a problem unique to two or more cells connected in a series (one cell may drive a defective cell into reversal) to form a battery, diodes have not generally been utilized for the protection of individual cells.

In lanterns adapted for use with the leclanche batteries the most common bulb types are the PR-13 and PR-15 with rated voltages of 4.8 and rated lives of 15 and 30 hours respectively. Exposure of such bulbs to voltages above 4.8 volts for extended periods of time severely reduces their lifetimes. It is however noted that bulb failure is not always inevitable and is dependent upon the specific type of filament composition and construction. However, because cells and batteries are not restricted to utilization with the more resistant bulbs, application of the present invention is required for greater consumer acceptance in all applications.

Figure 3:
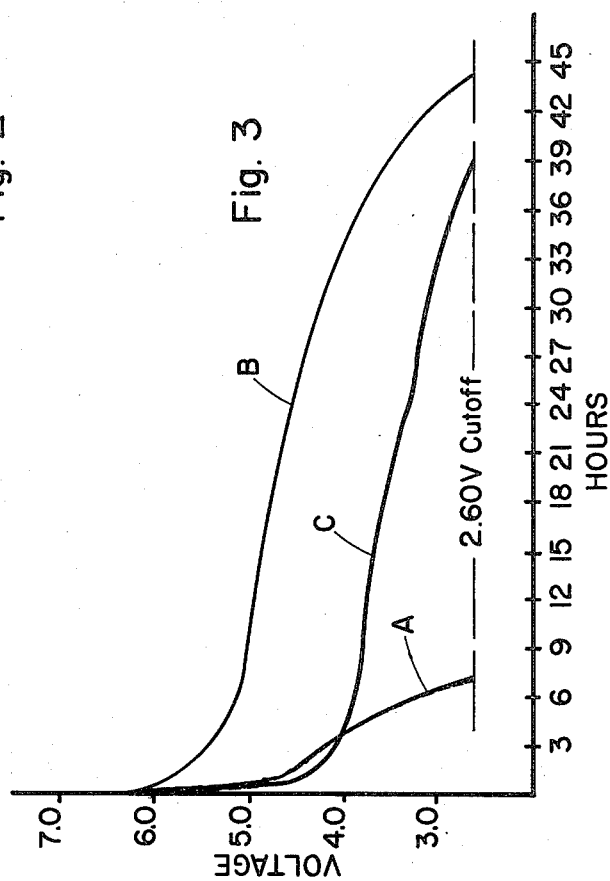
FIG. 3 is a discharge curve comparing the voltages of equivalent size, as in FIG. 1, alkaline $Zn/MnO_2$ (with and without the voltage reduction means of the present invention) and leclanche batteries.
Figure 1:
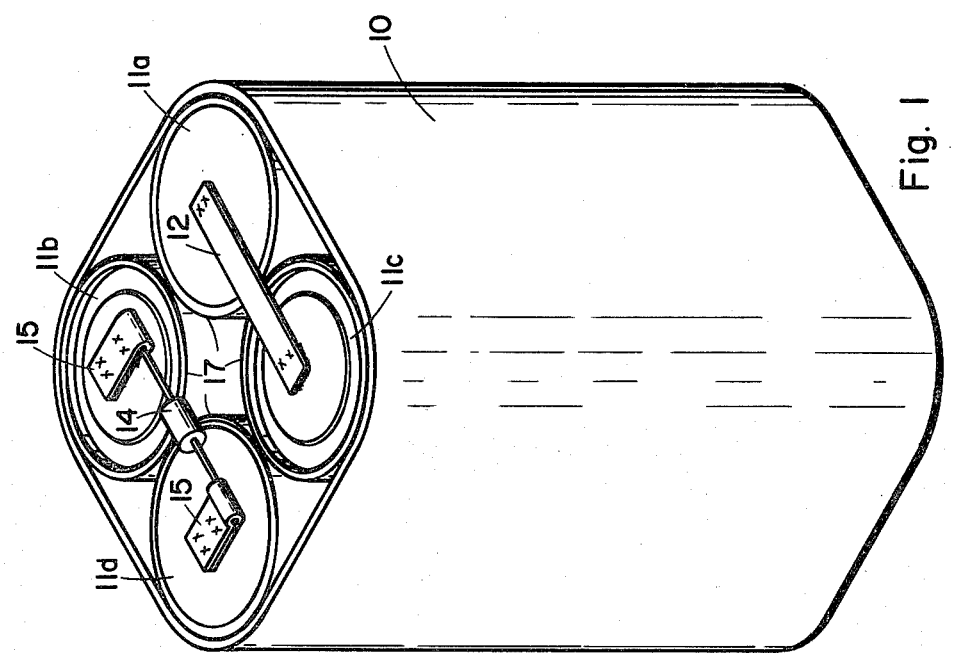
FIG. 1 is an isometric view of a battery with jacket end removed, containing the voltage reduction means of the present invention.

FIG. 1 depicts a battery 10 of four series connected cells 11 a-d in a typical lantern battery configuration. Each of the cells 11 a-d is wrapped with a heat shrink insulative material 17 to prevent intercell short circuiting. Resistive nickel chromium alloy tab 12 electrically interconnects cells 11a and 11c and silicon diode 14 electrically interconnects cells 11b and 11d. The diode is enwrapped at its ends with folded tab stock 15 whereby it is welded to cells 11b and 11d for positive electrical connection. Cells 11c and 11d are electrically interconnected at their other ends (not shown) with a resistive nickel chromium tab such as tab 12. The remaining terminals of cells 11a and 11b (not shown) provide the external terminal connection to an electrical device to be powered therewith such as a lantern. FIG. 2 schematically depicts the series circuit of the cells with the voltage reduction means of the present invention. In the configuration shown wherein the cells are "F" cells (1.3" D (3.3 cm)×3.4" H (8.6 cm)) the resistive tabs in the preferred embodiment of 2.25 mil (0.056 mm) thick Tophet C nickel chromium alloy are each 1.5" (3.8 cm) with acumulative resistance of 0.5 ohms. The voltage drop for the silicon diode is about 0.7 and that of the resistive elements is about 0.25 volts for a total voltage drop of nearly one volt for the four cell battery. As depicted in FIG. 3 discharge curves A and B are of a leclanche battery and a Zn/MnO$_2$ battery respectively and FIG. C is that of the Zn/MnO$_2$ battery with the voltage reduction means of the present invention as shown in FIG. 1. Batteries A, B and C were discharged with a PR-15 bulb at room temperature. It should be noted that several bulbs were blown after about 3 hours of discharge of Zn/MnO$_2$ batteries without the voltage reduction means until a bulb was able to last through the entire discharge. Though there is a capacity penalty with the utilization of the voltage reduction means it is only about 10-15%. This is more than compensated for by the nearly sixfold lifetime of the battery as compared to the leclanche battery of the same size and the possibility of having a battery of high capacity but with an inoperable device.

It is understood that various modifications may be made in the cells and batteries to be used in the present invention such as the use of transistors with diode p-n junctions and constant voltage drops and the invention is not limited to the specifics illustrated above except as defined in the following claims.

What is claimed is:

1. A method for adapting a high voltage battery for lower voltage applications comprising the step of reducing the voltage of said battery by placing one or more p-n junctions and one or more resistive elements in series with cells of said battery whereby the cumulative voltage drop caused by said p-n junctions and resistive elements results in a voltage suitable for said lower voltage application.

2. The method of claim 1 wherein said p-n junction is embodied in a diode.

3. The method of claim 1 or 2 wherein said resistive elements are comprised of resistive metal tabs.

4. The method of claim 3 wherein said tabs provide at least one intercell electrical connection within said battery.

5. A battery comprising one or more cells having a high output voltage in that said battery further contains one or more p-n junctions and one or more resistive elements in series with said cells whereby said output voltage of said battery is lowered thereby by a predetermined amount.

6. The battery of claim 5 wherein said p-n junction is embodied in a diode.

7. The battery of claims 5 or 6 wherein said resistive elements are comprised of resistive metal tabs.

8. The battery of claim 5 wherein said resistive elements are comprised of resistive metal tabs which provide at least one intercell electrical connection within said battery.

* * * * *